Oct. 28, 1941.   E. ZURCHER   2,261,045
TEMPERATURE REGULATOR
Filed July 10, 1939   3 Sheets—Sheet 1

Inventor
Ernest Zurcher.
By Cameron, Kerkam & Sutton
Attorneys

Oct. 28, 1941.  E. ZURCHER  2,261,045
TEMPERATURE REGULATOR
Filed July 10, 1939  3 Sheets—Sheet 2
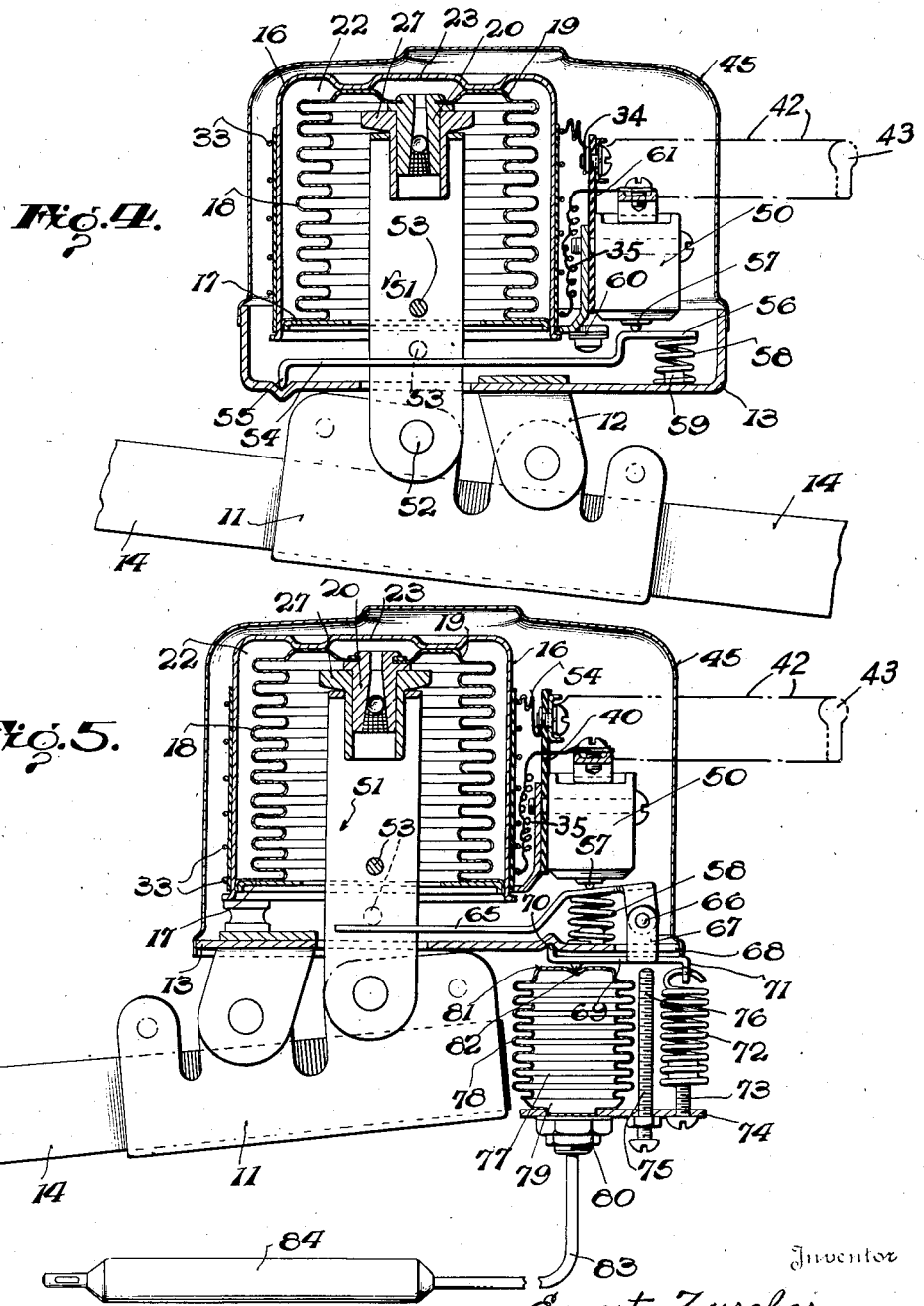
Inventor
Ernest Zurcher
By Cameron, Kerkam + Sutton
Attorneys Oct. 28, 1941.
E. ZURCHER
2,261,045
TEMPERATURE REGULATOR
Filed July 10, 1939
3 Sheets-Sheet 3
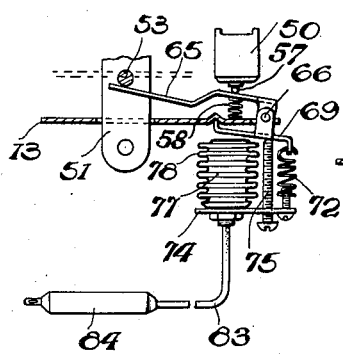
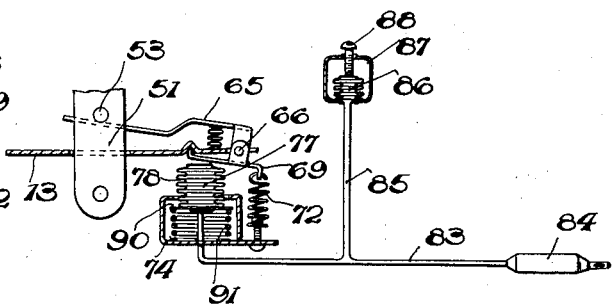
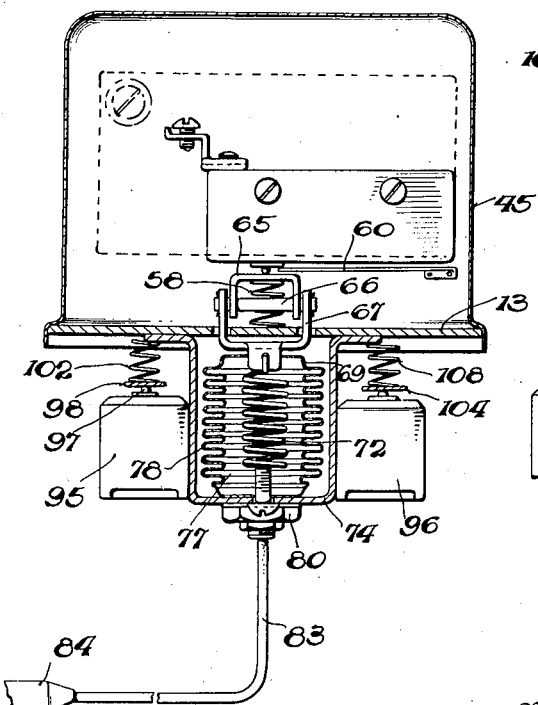
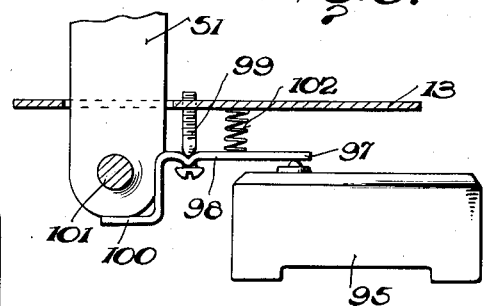
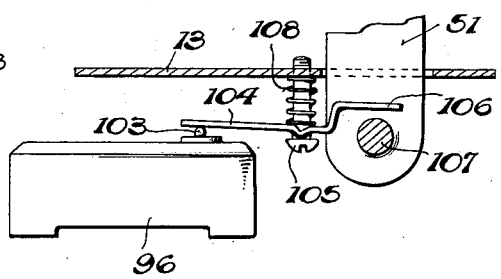
Inventor
Ernest Zurcher.
By Cameron, Kerkam & Sutton
Attorneys Patented Oct. 28, 1941

2,261,045

UNITED STATES PATENT OFFICE 2,261,045

TEMPERATURE REGULATOR

Ernest Zurcher, Knoxville, Tenn., assignor to The Fulton Sylphon Company, Knoxville, Tenn., a corporation of Delaware Application July 10, 1939, Serial No. 283,712

20 Claims. (Cl. 236—68)

This invention relates to temperature regulators, and, more particularly, to heat motors for operating one or more dampers, but in its broader aspects the invention may be employed for actuating other suitable means to be controlled.

It is an object of this invention to provide a heat motor of the type characterized having a wide range of utility and available for operating a wide variety of dampers, as of furnaces, ventilating systems, heating systems, etc., as well as other suitable means to be controlled.

Another object of this invention is to provide a device of the type characterized which may be readily associated with means for modulating the temperature to be maintained or the position which the damper or other means is caused to take by the operation of the heat motor.

Another object of this invention is to provide a device of the type characterized which is so constructed that upon failure of the heat motor or the power for heating the same a predetermined damper position of safety will be assumed.

Another object of this invention is to provide a device of the type characterized which, when associated with means for modulating the temperature, will upon failure of said modulating means assure that a predetermined damper position will be assumed.

Another object of this invention is to provide a device of the type characterized which will prevent injury to the heat motor in the event that the load is excessive, as for example in the event that a damper should jam.

Another object of this invention is to provide a device of the type characterized having means for modulating the temperature to be maintained which will function independently of the heat motor and its controlling means.

Another object of this invention is to provide a device of the type last referred to with readily operable means for varying the temperature to be maintained or for predetermining minimum damper opening or both.

Another object of this invention is to provide a device of the type characterized with means for actuating one or more switches which may control independent circuits, such for example as for opening and closing the valves of radiators associated with a ventilating system.

Another object of this invention is to provide a device of the type characterized which does not require that the controlled damper or other means be moved from fully opened to fully closed position, or from one limit position to the other, at each reversal in the direction of movement thereof, but which is so constructed that the damper or other means is caused to cycle around a predetermined position.

Another object of this invention is to provide a device of the type last referred to which includes means for modulating the temperature about which said damper or other means cycles.

Another object of this invention is to provide a device of the type last characterized which includes means for predetermining the limit position, as a minimum damper position, taken as a result of the operation of said modulating means.

Another object of this invention is to provide a device of the type characterized that is provided with modulating means which is readily adjustable to predetermine the temperature about which the damper or other means cycles.

Another object of this invention is to provide a device of the type characterized which is relatively simple in construction, easy to install and regulate, and highly efficient in operation.

Other objects of the invention will appear as the description thereof proceeds.

The invention is capable of receiving a variety of mechanical expressions some of which are illustrated on the accompanying drawings, but it is to be expressly understood that the drawings are for purposes of illustration only and are not to be construed as a definition of the limits of the invention, reference being had to the appended claims for that purpose.

Referring in detail to the accompanying drawings, wherein the same reference characters are employed to designate corresponding parts in the several figures, Fig. 1 is a sectional view, somewhat diagrammatic, to illustrate one embodiment of the present invention;

Fig. 4 is a sectional view, somewhat diagrammatic, to illustrate another embodiment of the invention;

Fig. 5 is a sectional view, somewhat diagrammatic, to illustrate a third embodiment of the invention which includes means for modulating the temperature to be maintained;

Fig. 6 is a corresponding but fragmentary view on a smaller scale to illustrate the relationship assumed by the parts of the embodiment of Fig. 5 under one condition of operation;

Fig. 7 is a diagrammatic view to illustrate another feature of the invention;

Fig. 8 is an elevation, partly in section, to illustrate another feature of the invention; and Figs. 9 and 10 are fragmentary views, somewhat diagrammatic, taken at right angles to Fig. 8 to illustrate the operation of auxiliary switches.

Figure 1:
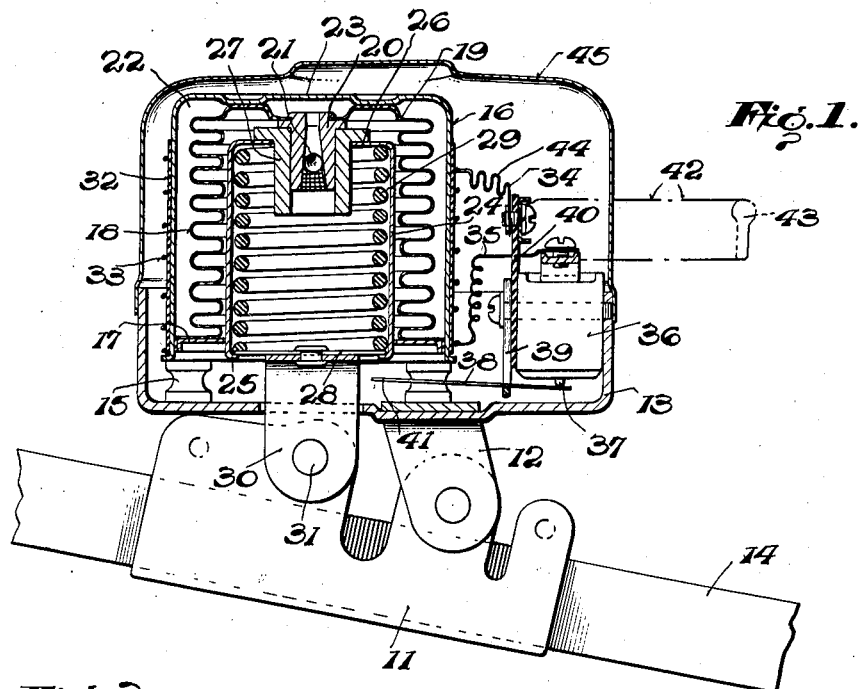
Figures 2, 3:
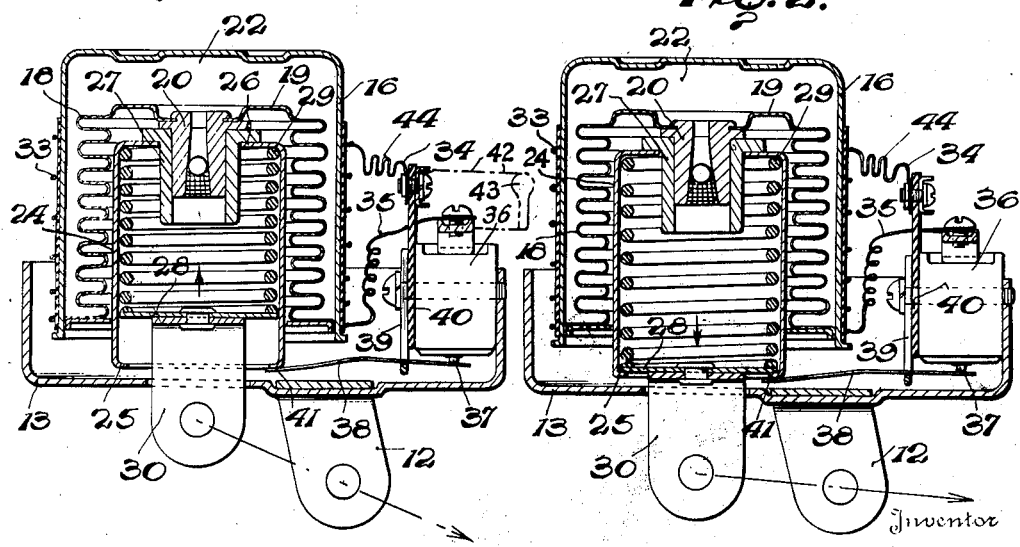
Fig. 2 is a corresponding view to illustrate a relationship assumed by the parts under one condition of operation.
Fig. 3 is a corresponding view to illustrate a relationship assumed by the parts under another condition of operation.

Referring first to the embodiment of Figs. 1, 2 and 3 which illustrates a damper-operating device, 11 designates a bracket pivotally mounted on a lug or lugs 12 projecting downwardly from a base 13 mounted in any suitable way, said bracket 11 being formed to receive a damper operating lever 14 which may be connected in any suitable way with one or more dampers to be controlled and of any suitable character and function. Said lever may also be provided with one or more weights, which may be adjustable, to predetermine the load as understood in the art. For convenience of description it will be herein assumed that only one damper is connected to said lever 14, but it is to be understood that any suitable number of dampers may be controlled from said lever 14 and said dampers may be associated with air ducts in heating or ventilating systems or the like or with furnaces, etc.

Suitably mounted on the base 13, as by a plurality of posts 15, preferably of heat-insulating material, is an inverted cup-shaped relatively-rigid wall 16 having secured within the open end thereof a ring 17 to which an expansible and collapsible corrugated metal wall or bellows 18 is suitably attached, or it may be formed integrally therewith. Bellows 18 has suitably secured to the opposite end thereof, or formed integrally therewith as shown, an end wall 19 in which is hermetically sealed a thimble 20 apertured to provide a filling opening, that is subsequently sealed as by the ball and solder at 21, leading to the chamber 22 between said bellows 18 and said cup-shaped wall 16. As illustrated end wall 19 and the end wall 23 of said cup-shaped wall 16 may be so formed as to cooperate in providing a stop to limit the extent of the expansion of the bellows 18.

Slidably mounted within the aperture provided by the ring 17 is a second cup-shaped wall 24 having its outer end inwardly flanged as shown at 25 and its inner end wall 26 apertured to receive a second thimble 27 that telescopes over the thimble 20 and has its flange engaged with said end wall 26 to move cup-shaped wall 24 as hereinafter explained. Thimble 27 is preferably of heat-insulating material to retard heat flow. Normally seated against the flange 25 is a plate 28 between which and the end wall 26 of said cup-shaped wall 24 is a relatively stiff coil spring 29. Plate 28 has suitably attached thereto an operating post or bracket 30 which is pivoted to the bracket 11 at 31.

Suitably associated with the cup-shaped wall 16 and here shown as surrounding the same with interposed mica or other suitable insulation 32 is a heating coil 33 employing any suitable number of turns and diameter of wire depending upon the rate of heating desired. Heating coil 33 is in series through leads 34 and 35 with a switch 36 of any suitable construction but of such internal construction that it is normally closed by an interior spring. Cooperating with the actuating plunger 37 of said switch 36 is a resilient lever 38, here shown as in the form of a resilient plate notched at its lateral extremities so as to be retained within the slot of a bracket 39 secured to the plate 40 which, together with the switch 36, is secured in any suitable way to the base 13. Resilient lever 38 projects inwardly as shown at 41 into the path of movement of the flange 25.

The heating coil 33 and switch 36 are in series in any suitable circuit 42 leading to an electrically actuated thermostat, which may be a wall thermostat, diagrammatically indicated at 43, in the room or other space whose temperature is to be controlled. Although as hereinafter explained the circuit to the heat motor is automatically opened by the operation of the device so far described, a fusable link 44 may be interposed in the circuit if desired, preferably adjacent the coil 33, so that in the event that the temperature at the coil rises above a predetermined maximum said link will melt and prevent injury to the instrument. The heat motor and switch 36, together with associated parts, may be enclosed in any suitable casing or cover 45 suitably attached to the base 13.

The chamber 22 of the heat motor is charged with any suitable volatile liquid, such for example as ether, that will vaporize and produce a predetermined pressure and expand the chamber 22 by collapsing the bellows 18 against the load on the lever 14 to effect the operation to be described.

When the circuit through the coil 33 is open at the thermostat 43 the parts are in the position shown in Fig. 1. The volatile fluid in the chamber 22 is condensed and the bellows 18 has expanded until its end wall 19 has engaged the end wall 23 of the cup-shaped wall 16. Switch 36 is closed, and therefore when the temperature at the thermostat 43 effects a closure of the circuit including said switch 36 and the coil 33, said coil is promptly heated to volatilize the liquid within the chamber 22 and thereby increase the pressure in said chamber. By suitably proportioning the coil 33 the desired pressure in chamber 22 can be produced in a predetermined lapse of time, say five minutes. Under normal conditions of operation the increased pressure in said chamber 22 moves the end wall 19 downwardly as viewed in Fig. 2, collapsing the bellows 18 and moving the bracket 11, the cup-shaped wall 24, coil spring 29, plate 28 and post or bracket 30 moving as a unit because the spring 29 is of such strength that under normal operation it is not compressed by the expansion of the chamber 22. Thus the lever 14 is pivoted on the lug or lugs 12 and the damper operatively connected thereto is actuated.

The expansion of the chamber 22 with corresponding actuation of the lever 14 continues until flange 25 engages the free end 41 of the lever 38, said lever tilting about its fulcrum on bracket 39 to thrust inwardly and open the switch 36 against the tension of its internal spring and thereby interrupt the flow of current through the coil 33. The time elapsed in thus actuating lever 14 to move the damper to limit position can be nicely controlled by predetermining the amount of heat energy generated at the coil 33. When the switch 36 opens, the coil 33 cools and the vapor in the chamber 22 condenses, whereupon the bellows 18 expands under the action of the load on lever 14 (although if desired a spring could be provided for expanding said bellows if the load on the lever 14 is not sufficient to effect the desired operation) and flange 25 thereby moves away from the free end of lever 38, permitting the switch 36 to close under the action of its internal spring and thus restore flow of current through the coil 33. This intermittent heating and cooling of the coil 33 will continue as long as the circuit through the thermostat 43 is closed, and thus the damper will move slightly or cycle about its predetermined position, the slight movement thus involved being found unobjectionable. When the circuit through the thermostat 43 opens, however, the flow of current through the coil 33 is discontinued and the parts moved back to the position shown in Fig. 1.

If the heating effect of coil 33 causes the chamber 22 to continue to expand slightly beyond the position at which the switch 36 is opened, the lever 38 can bend as shown in Fig. 2, the parts being otherwise shown to illustrate the normal operation of the device when the switch has been opened; but owing to the resiliency of said lever 38 the lever will assume its normal unstressed condition as soon as contraction of the chamber 22 releases the pressure of the flange 25 on lever 38. If for any reason the heating effect should continue, the bending of the lever 38 is preferably discontinued by engagement with the base 13 before said lever takes a permanent set.

If for any reason the load on the lever 14 is such that the pressure developed in chamber 22 is unable to move the same, as might occur for example if a damper became jammed, the parts assume the relationship shown in Fig. 3. As here illustrated the chamber 22 expands as heretofore described, but the plate 28 remains stationary because of its attachment to the now immovable lever 14 and bracket 11. Cup-shaped wall 24 slides through the aperture in the ring 17, as during normal operation of the device, but against the tension of the spring 29 which is collapsed. As in normal operation the flange 25 engages the free end of the lever 38 and opens the switch when a predetermined pressure has been reached in the chamber 22 and, as under normal operation, if the chamber 22 continues to expand the lever 38 will bend as shown in Fig. 3.

If the bellows 18 fails for any reason, or if there is any break in the heating circuit or failure of the power, the parts automatically assume the position shown in Fig. 1 which is a position of safety as the damper is left in that position which corresponds with no demand for heat.

In the embodiment shown in Fig. 4 the bracket 11 is again shown as pivoted by means of a lug or lugs 12 to a base 13 and carries a lever 14 as heretofore referred to. Suitably mounted on the base 13 is a heat motor including an outer cup-shaped wall 16 and bellows 18 defining an expansible and collapsible chamber 22 therebetween, as in the embodiment of Figs. 1 to 3. Also as in said embodiment of Figs. 1 to 3 a heating coil 33 is associated with said chamber 22 and suitably connected to a switch 50 in circuit with a thermostat as diagrammatically indicated at 43, said switch in this embodiment being one that is normally held in open position by reason of an internal spring. In this embodiment the movable end wall 19 of the bellows 18 is operatively connected, as through the thimbles 20 and 27, with a post 51 which is pivotally connected to the bracket 11 at 52 and which carries a pin 53 for operating the lever 54 that actuates the switch 50. Said lever 54 is positioned in the path of the pin 53 and is fulcrumed on the base 13 at 55, as by having its bent end engaged in the depression formed in said base. The opposite end 56 of said lever 54 is normally held in engagement with the plunger 57 of the switch 50 by a coil spring 58 which is stronger than the internal spring of said switch so that said switch is held normally closed by said spring 58. Spring 58 may be located in any suitable way as by the stud 59.

In this embodiment a bimetallic element 60 is suitably mounted on the bracket 61 (see also Fig. 8), which also carries the switch 50, and projects over the lever 54. If the temperature produced at the coil exceeds a predetermined degree, as if for example the switch lever 54 is not actuated from the chamber 22 to open the switch 50 as hereafter explained, said bimetallic element 60 will flex downwardly as viewed in Fig. 4 and depress the lever 54 against the tension of the spring 58, thereby permitting switch 50 to open under the action of its internal spring.

The operation of the embodiment of Fig. 4 will be apparent from the description heretofore given of the embodiment of Figs. 1 to 3. As the circuit is normally closed through the switch 50 by the reason of the action of the spring 58, the parts remain in the relationship shown in Fig. 4 until the circuit in the coil 33 is closed by the thermostat 43. Thereafter chamber 22 expands, moving post 51 downwardly until pin 53 moves from its full line to its dotted line position to engage the lever 54 and move the same in a clockwise direction around its fulcrum 53 against the tension of the spring 58, thereby permitting the switch 50 to open under the action of its internal spring. Cooling of the coil 33 results in the contraction of the chamber 22 and the withdrawal of pin 53 from lever 54, whereupon the switch 50 is again closed, and thus the damper is caused to cycle about its predetermined position. If for any reason the lever 14 is not moved so that the coil 33 continues to heat, bimetallic element 60 will at a predetermined temperature actuate the lever 54, as heretofore explained, and discontinue the heating of said coil 33.

Here also it will be observed that if the bellows fails or there is a failure of power at the coil 33, the parts automatically assume the position shown in Fig. 4 which is a position of safety.

Fig. 5 illustrates an embodiment of the present invention which is or may be of the same construction as illustrated in Fig. 4 except as hereinafter noted, but certain parts being omitted for clearness, or it could be of a construction similar to that shown in Figs. 1 to 3, this embodiment being provided with means for modulating the position about which the damper is cycled.

The switch 50 is of the type which is normally open, but it is held closed under normal conditions by the action of a spring 58 which is stronger than the internal spring of the switch 50, said spring 58 acting on a lever 65 which engages the plunger 57 of said switch and which projects into the path of the pin 53 on post 51. In this embodiment, however, the lever 65 is pivoted at 66 on a bracket 67 which projects through an aperture 68 in the base 13 (see also Fig. 8), said bracket 67 being attached to or formed integrally with a lever 69 which is fulcrumed at 70 and which at its free end 71 is engaged by a coil spring 72 whose tension may be adjusted by a screw 73 and which screw is mounted in a U-shaped bracket 74 (compare Fig. 8) formed on or suitably attached to the base 13. Also mounted in the bracket 74 is a threaded stop screw 75 whose free end 76 may be adjusted to predetermine the maximum extent to which the lever 69 may be drawn downwardly, as viewed in Fig. 5, by the action of the spring 72. Also mounted on the bracket 74 is a motor vessel 77 in the form of an expansible and collapsible corrugated metallic wall or bellows 78 having a stationary end wall 79 suitably secured to the bracket 74, as by the nut 80, and having its movable end wall 81 engaged with a knife edge or other suitable projection 82 formed on the lever 69. Communicating with the motor vessel 77 is a capillary tube 83 which may extend any suitable distance to a bulb 84 designed to be subjected to the temperature of the medium which is to modulate the operation of the damper operator, as for example the temperature of air introduced from outdoors.

The relationship of the parts when the temperature at the bulb 84 is below that at which modulation can be effected is shown in Fig. 6. The spring 72 holds the lever 69 against the end 76 of the stop screw 75, and the lever 65 is thus tilted upwardly, as shown in Fig. 6, fulcruming on the plunger 57 to a position such that a relatively small expansion of the chamber 22 is sufficient to engage pin 53 with lever 65 and move the same about its pivot 66 against the tension of spring 58 and thus permit the switch 50 to open under the action of its internal spring. This relationship of the parts may correspond to a minimum opening of a cold air damper. As long as the temperature at 84 does not exceed a predetermined degree cycling will effect an opening of the damper attached to the lever 14 only to the minimum extent corresponding to this minimum expansion of the chamber 22, and if the damper is to be entirely closed, as at night for example or when the device is to be put out of operation, the circuit through the coil 33 must be opened, whereupon the parts will assume the relationship heretofore described in conjunction with the embodiment of Fig. 4, which corresponds to the position when the circuit through the room thermostat is open. When the temperature at 84 rises above a predetermined degree the charge in the thermostat composed of bulb 84, capillary tube 83 and motor vessel 77 expands and moves the lever 69 against the tension of its spring 72 into the position shown in Fig. 5. Owing to the change of the pivot 66 thus effected, the lever 65 fulcrums on the plunger 57 and the free end of the lever 65 is thus held in a lower position as viewed in Fig. 5 so that a larger expansion of the chamber 22 is required before the circuit is opened at the switch 50. By adjusting the stop screw 75 the extent to which the lever 69 may be moved about its fulcrum 70 by spring 72, and therefore the position of the pivot 66 and the free end of the lever 65, may be nicely adjusted to predetermine what shall be the minimum extent to which the damper operating lever 14 is moved by closure of the circuit through heating coil 33.

The thermostat composed of bulb 84, capillary tube 83 and motor vessel 77 may be charged with a volatile fluid or they may be completely filled with an expansible and collapsible liquid, the latter being preferable if the bulb 84 is to be placed at a location quite remote from the motor vessel 77. When an expansible and contractible liquid is used, as just referred to, the minimum temperature of response of the thermostat, 84, 83, 77, may be made adjustable as shown in Fig. 7 by providing, at any suitable location, a branch capillary tube 85 which communicates with the tube 83 at one end and which communicates at its other end with an expansible and collapsible chamber 86 suitably mounted in a housing 87 provided with an adjusting screw 88 by means of which the chamber 86 may be contracted or expanded to force more or less liquid into the system composed of the bulb 84 and motor vessel 77. If a volatile fluid thermostat is used it may be made adjustable in the usual or any suitable way.

Fig. 7 also illustrates diagrammatically means whereby overheating of the fluid in the thermostat 84, 83, 77 will not produce injury of the parts. As here shown, the motor vessel 77 is not secured to the bracket 74, but has its relatively fixed end mounted on a plate 90 which is supported from the bracket 74 by means of a coil spring 91, so that if motor vessel 77 continues to expand after the lever 69 has been engaged with the base 13, spring 91 will yield and avoid injury of the parts. Otherwise the embodiment of Fig. 7 may be the same as heretofore described in conjuction with Figs. 5 and 6, some of the parts as the adjusting screw 75 and switch 50 having been omitted for clearness of illustration.

In addition to actuating the damper lever 14 as heretofore described, it may be desirable to turn on or off a unit radiator or to turn on or off a direct radiator or perform other analogous functions in addition to operating one or more dampers when the coil 33 is heated to actuate motor vessel 22. The embodiment of Figs. 8, 9 and 10 illustrates a construction which is or may be the same as heretofore described in conjunction with the embodiments of Figs. 4 to 7, but in this embodiment the U-shaped bracket 74 carries at one or both sides thereof switches 95 and 96. Cooperating with the plunger 97 of switch 95 is a lever 98 fulcrumed on the head of an adjustable screw 99 suitably supported in the bracket or base and having its free end 100 extended into the path of a pin 101 on the post 51, or it may be an extension of pin 53. A coil spring 102 cooperates with the lever 98 to hold its opposite end in engagement with the plunger 97, and spring 102 may yield to permit overrun of the pin 101. Similarly switch 96 has its plunger 103 associated with a lever 104 which is pivoted on the head of an adjustable screw 105 mounted in the bracket or base and having its opposite end 106 in the path of a pin 107 suitably provided on the post 51. Lever 104 is held in operative engagement with the head of said adjustable screw 105 by a coil spring 108 which may yield to permit the lever 104 to fulcrum on plunger 103 as pin 107 moves upwardly as shown in Fig. 10.

It is to be expressly understood that either one or both of the auxiliary switches and its associated operating means may be employed and when only one is used either of the arrangements shown in Figs. 9 and 10 may be employed, but in any event the circuit through the switch 95 or the switch 96 or both can be controlled from the chamber 22 and the post 51 to operate valves or other suitable devices as in obtaining desired temperature control.

It will therefore be perceived that by the present invention a novel heat motor has been provided which has a wide range of utility for operating dampers, whether of furnaces, ventilating systems, heating systems, or the like, and which is of utility for other uses as will be apparent to those skilled in the art. Said heat motor does not require a movement of the damper or other means from one limit position to the other at each actuation thereof, but causes the damper or other means to cycle around a predetermined position as long as the damper or other means is operated by the heat motor. The present invention also provides means for modulating the temperature to be maintained by varying the position around which the damper or other means cycles and which modulating means may be readily adjusted to predetermine the action thereof. At the same time the present invention provides that the damper or other means will move to a position of safety upon failure of the controlling means or failure of the current through which the controlling means is actuated. Means have also been provided whereby the instrument is not injured in the event that the load is excessive, as when, for example, a damper becomes jammed.

The present invention also provides for the adjustment of the minimum open position of the damper, such as may be desirable in ventilating systems; and also for the instrument to simultaneously actuate one or more other circuits such as may be used for opening or closing radiators or performing other functions desired in the actuation of a heating or ventilating system. The device is relatively simple in construction, easy to install and adjust, and highly efficient in operation.

While the embodiments of the invention illustrated on the drawings have been described with considerable particularity, it is to be expressly understood that the invention is not restricted thereto, as the same is capable of receiving a variety of mechanical expressions other than those illustrated, as will now be apparent to persons skilled in the art, while changes may be made in the details of construction, arrangement, proportion of parts, and certain features used without other features, or features here illustrated only in conjunction with different embodiments may be combined in a single embodiment, etc., without departing from the spirit of this invention. Reference is therefore to be had to the claims hereto appended for a definition of said invention.

What is claimed is:

1. In a device of the character described, in combination with a damper actuating lever, a heat motor connected to said lever and adapted to cause the damper to cycle around a predetermined position, said heat motor including an expansible and collapsible chamber charged with a volatile liquid, a heating coil associated with said chamber, a circuit connected to said coil including means for opening and closing said circuit, a switch in said circuit associated with said motor, means actuated by said chamber as it expands for opening said switch at substantially the predetermined damper position and for effecting the closure of said switch substantially as soon as said chamber begins to contract, and means for discontinuing the operation of said heating coil at a predetermined temperature if said damper operating lever is not moved by the expansion of said chamber.

2. In a device of the character described, in combination with a damper actuating lever, a heat motor connected to said lever and adapted to cause the damper to cycle around a predetermined position, said heat motor including an expansible and collapsible chamber charged with a volatile liquid, a heating coil associated with said chamber, a circuit connected to said coil including means for opening and closing said circuit, a switch in said circuit associated with said motor, and means actuated by said chamber as it expands for opening said switch at substantially the predetermined damper position and for effecting the closure of said switch substantially as soon as said chamber begins to contract, said last named means including a member associated with said switch and operated by the expansion and contraction of said chamber for opening and closing said switch, and means to adjust said member toward and away from said chamber to modulate the position about which said damper operating lever cycles.

3. In a device of the character described, in combination with a damper actuating lever, a heat motor connected to said lever and adapted to cause the damper to cycle around a predetermined position, said heat motor including an expansible and collapsible chamber charged with a volatile liquid, a heating coil associated with said chamber, a circuit connected to said coil including means for opening and closing said circuit, a switch in said circuit associated with said motor, and means actuated by said chamber as it expands for opening said switch at substantially the predetermined damper position and for effecting the closure of said switch substantially as soon as said chamber begins to contract, said last named means including a resiliently bendable lever mounted on a fulcrum and cooperating with said switch and a member operated by the expansion and contraction of said chamber for engaging and disengaging said lever to pivot said lever about its fulcrum, said lever under normal operation by said last named member pivoting around its fulcrum to actuate said switch but said lever bending if said chamber continues to expand after said lever has moved to its extreme position wherein said switch is opened.

4. In a device of the character described, in combination with a damper actuating lever, a heat motor connected to said lever and adapted to cause the damper to cycle around a predetermined position, said heat motor including an expansible and collapsible chamber charged with a volatile liquid, a heating coil associated with said chamber, a circuit connected to said coil including means for opening and closing said circuit, a switch in said circuit associated with said motor, means actuated by said chamber as it expands for opening said switch at substantially the predetermined damper position and for effecting the closure of said switch substantially as soon as said chamber begins to contract, and means for opening said switch if after continued operation of said heating coil said damper-operating lever is not moved by the expansion of said chamber.

5. In a device of the character described, in combination with a damper actuating lever, a heat motor connected to said lever and adapted to cause the damper to cycle around a predetermined position, said heat motor including an expansible and collapsible chamber charged with a volatile liquid, a heating coil associated with said chamber, a circuit connected to said coil including means for opening and closing said circuit, a switch in said circuit associated with said motor, means actuated by said chamber as it expands for opening said switch at substantially the predetermined damper position and for effecting the closure of said switch substantially as soon as said chamber begins to contract, said last named means including a lever associated with said switch and a member moved by the expansion and contraction of said chamber for engaging and disengaging said lever, and means for moving said last named lever if after continued operation of said heating coil said damper-operating lever is not moved by the expansion of said chamber.

6. In a device of the character described, in combination with a damper actuating lever, a heat motor connected to said lever and adapted to cause the damper to cycle around a predetermined position, said heat motor including an expansible and collapsible chamber charged with a volatile liquid, a heating coil associated with said chamber, a circuit connected to said coil including means for opening and closing said circuit, a switch in said circuit associated with said motor, means actuated by said chamber as it expands for opening said switch at substantially the predetermined damper position and for effecting the closure of said switch substantially as soon as said chamber begins to contract, said last named means including a lever associated with said switch and a member moved by the expansion and contraction of said chamber for engaging and disengaging said lever, and means for moving said last named lever if said damper-operating lever is not moved by the expansion of said chamber, said last named means including a bimetallic element associated with said heating coil and adapted to engage and operate said switch-operating lever.

7. In a device of the character described, in combination with a damper actuating lever, a heat motor connected to said lever and adapted to cause the damper to cycle around a predetermined position, said heat motor including an expansible and collapsible chamber charged with a volatile liquid, a heating coil associated with said chamber, a circuit connected to said coil including means for opening and closing said circuit, a switch in said circuit associated with said motor, means actuated by said chamber as it expands for opening said switch at substantially the predetermined damper position and for effecting the closure of said switch substantially as soon as said chamber begins to contract, said last named means including a lever associated with said switch and a member moved by the expansion and contraction of said chamber for engaging and disengaging said lever, and means for moving said lever if said damper-operating lever is not moved by the expansion of said chamber, said last named means including a spring pressed element operatively connected to said damper-operating lever and movable relatively thereto if said damper-operating lever is immovable to engage and operate said switch-operating lever.

8. In a device of the character described, in combination with a damper actuating lever, a heat motor connected to said lever and adapted to cause the damper to cycle around a predetermined position, said heat motor including an expansible and collapsible chamber charged with a volatile liquid, a heating coil associated with said chamber, a circuit connected to said coil including means for opening and closing said circuit, a switch in said circuit associated with said motor, means actuated by said chamber as it expands for opening said switch at substantially the predetermined damper position and for effecting the closure of said switch substantially as soon as said chamber begins to contract, and means for modulating the position about which said damper-operating lever is cycled by the expansion and contraction of said chamber.

9. In a device of the character described, in combination with a damper actuating lever, a heat motor connected to said lever and adapted to cause the damper to cycle around a predetermined position, said heat motor including an expansible and collapsible chamber charged with a volatile liquid, a heating coil associated with said chamber, a circuit connected to said coil including means for opening and closing said circuit, a switch in said circuit associated with said motor, means actuated by said chamber as it expands for opening said switch at substantially the predetermined damper position and for effecting the closure of said switch substantially as soon as said chamber begins to contract, said last named means including a lever associated with said switch and a member moved by the expansion and contraction of said chamber for engaging and disengaging said lever, and means for adjusting the fulcrum of said last named lever to modulate the position about which said damper-operating lever is cycled by the expansion and contraction of said chamber.

10. In a device of the character described, in combination with a damper actuating lever, a heat motor connected to said lever and adapted to cause the damper to cycle around a predetermined position, said heat motor including an expansible and collapsible chamber charged with a volatile liquid, a heating coil associated with said chamber, a circuit connected to said coil including means for opening and closing said circuit, a switch in said circuit associated with said motor, means actuated by said chamber as it expands for opening said switch at substantially said predetermined damper position and for effecting the closure of said switch substantially as soon as said chamber begins to contract, said last named means including a lever associated with said switch and a member operated by the expansion and contraction of said chamber for engaging and disengaging said last named lever, and thermostatically controlled means for adjusting the fulcrum of said last named lever.

11. In a device of the character described, in combination with a damper actuating lever, a heat motor connected to said lever and adapted to cause the damper to cycle around a predetermined position, said heat motor including an expansible and collapsible chamber charged with a volatile liquid, a heating coil associated with said chamber, a circuit connected to said coil including means for opening and closing said circuit, a switch in said circuit associated with said motor, means actuated by said chamber as it expands for opening said switch at substantially the predetermined damper position and for effecting the closure of said switch substantially as soon as said chamber begins to contract, said last named means including a lever associated with said switch and a member operated by the expansion and contraction of said chamber for engaging and disengaging said lever, thermostatically controlled means for adjusting the fulcrum of said last named lever, and means for adjusting the limit position to which said last named means is moved when said thermostatically controlled means is inactive.

12. In a device of the character described, in combination with a damper actuating lever, a heat motor connected to said lever and adapted to cause the damper to cycle around a predetermined position, said heat motor including an expansible and collapsible chamber charged with a volatile liquid, a heating coil associated with said chamber, a circuit connected to said coil including means for opening and closing said circuit, a switch in said circuit associated with said motor, means actuated by said chamber as it expands for opening said switch at substantially the predetermined damper position and for effecting the closure of said switch substantially as soon as said chamber begins to contract, said last named means including a lever associated with said switch and a member operated by the expansion and contraction of said chamber for engaging and disengaging said lever, thermostatically controlled means for adjusting the fulcrum of said last named lever, and means for adjusting said thermostatically controlled means to vary its adjustment of said fulcrum.

13. In a device of the character described, in combination with a damper actuating lever, a heat motor connected to said lever and adapted to cause the damper to cycle around a predetermined position, said heat motor including an expansible and collapsible chamber charged with a volatile liquid, a heating coil associated with said chamber, a circuit connected to said coil including means for opening and closing said circuit, a switch in said circuit associated with said motor, means actuated by said chamber as it expands for opening said switch at substantially the predetermined damper position and for effecting the closure of said switch substantially as soon as said chamber begins to contract, said last named means including a member associated with said switch and operated by the expansion and contraction of said chamber for opening and closing said switch, and thermostatically operated means for modulating the position about which said damper operating lever cycles.

14. In a device of the character described, in combination with controlling means, a heat motor operably connected to said controlling means and adapted to cycle said controlling means around a predetermined position, said heat motor including an expansible and collapsible chamber charged with a volatile liquid, a heating coil associated with said chamber, a circuit connected to said coil and including means for opening and closing the same, a switch in said circuit and associated with said heat motor, a lever operably engaged with said switch, a member operated by the expansion and contraction of said chamber for engaging and disengaging said lever to open said switch when said chamber reaches a predetermined degree of expansion under the heating effect of said coil and substantially as soon as it starts to contract to actuate said switch and close said circuit, and thermostatically operated means to modulate the position about which said controlling means cycles.

15. In a device of the character described, in combination with controlling means, a heat motor operably connected to said controlling means and adapted to cycle said controlling means around a predetermined position, said heat motor including an expansible and collapsible chamber charged with a volatile liquid, a heating coil associated with said chamber, a circuit connected to said coil and including means for opening and closing said circuit, a switch in said circuit and associated with said heat motor, a lever operably engaged with said switch, a member operated by the expansion and contraction of said chamber for engaging and disengaging said lever to open said switch when said chamber reaches a predetermined degree of expansion under the heating effect of said coil and substantially as soon as it starts to contract to actuate said switch and close said circuit, and means for operating said switch lever when a predetermined temperature is effected by said coil in the event said controlling means is not moved by said chamber.

16. In a device of the character described, in combination with controlling means, a heat motor operably connected to said controlling means and adapted to cycle said controlling means around a predetermined position, said heat motor including an expansible and collapsible chamber charged with a volatile liquid, a heating coil associated with said chamber, a circuit connected to said coil and including means for opening and closing said circuit, a switch in said circuit and associated with said heat motor, a lever operably engaged with said switch, a member operated by the expansion and contraction of said chamber for engaging and disengaging said lever to open said switch when said chamber reaches a predetermined degree of expansion under the heating effect of said coil and substantially as soon as it starts to contract to actuate said switch and close said circuit, and means for modulating the position about which said controlling means cycles by adjusting the fulcrum of said switch lever.

17. In a device of the character described, in combination with controlling means, a heat motor operably connected to said controlling means and adapted to cycle said controlling means around a predetermined position, said heat motor including an expansible and collapsible chamber charged with a volatile liquid, a heating coil associated with said chamber, a circuit connected to said coil and including means for opening and closing said circuit, a switch in said circuit and associated with said heat motor, a lever operably engaged with said switch, a member operated by the expansion and contraction of said chamber for engaging and disengaging said lever to open said switch when said chamber reaches a predetermined degree of expansion under the heating effect of said coil and substantially as soon as it starts to contract to actuate said switch and close said circuit, and means for adjusting the fulcrum of said lever, said last named means including a thermostat and a lever actuated by said thermostat and upon which said switch lever is fulcrumed.

18. In a device of the character described, in combination with controlling means, a heat motor operably connected to said controlling means and adapted to cycle said controlling means around a predetermined position, said heat motor including an expansible and collapsible chamber charged with a volatile liquid, a heating coil associated with said chamber, a circuit connected to said coil and including means for opening and closing said circuit, a switch in said circuit and associated with said heat motor, a lever operably engaged with said switch, a member operated by the expansion and contraction of said chamber for engaging and disengaging said lever to open said switch when said chamber reaches a predetermined degree of expansion under the heating effect of said coil and substantially as soon as it starts to contract to actuate said switch and close said circuit, and means for adjusting the fulcrum of said lever, said last named means including a thermostat, a lever actuated by said thermostat and upon which said switch lever is fulcrumed, and means for predetermining the limit position of said thermostatically operated lever when the thermostat is inactive.

19. In a device of the character described, in combination with controlling means, a heat motor operably connected to said controlling means and adapted to cycle said controlling means around a predetermined position, said heat motor including an expansible and collapsible chamber charged with a volatile liquid, a heating coil associated with said chamber, a circuit connected to said coil and including means for opening and closing said circuit, a switch in said circuit and associated with said heat motor, a lever operably engaged with said switch, a member operated by the expansion and contraction of said chamber for engaging and disengaging said lever to open said switch when said chamber reaches a predetermined degree of expansion under the heating effect of said coil and substantially as soon as it starts to contract to actuate said switch and close said circuit, and means for adjusting the fulcrum of said lever, said last named means including a thermostat, a lever actuated by said thermostat and upon which said switch lever is fulcrumed, and means for adjusting said thermostat to vary the position of said thermostatically operated lever.

20. In a device of the character described, in combination with controlling means, a heat motor operably connected to said controlling means and adapted to cycle said controlling means around a predetermined position, said heat motor including an expansible and collapsible chamber charged with a volatile liquid, a heating coil associated with said chamber, a circuit connected to said coil and including means for opening and closing said circuit, a switch in said circuit and associated with said heat motor, a lever operably engaged with said switch, a member operated by the expansion and contraction of said chamber for engaging and disengaging said lever to open said switch when said chamber reaches a predetermined degree of expansion under the heating effect of said coil and substantially as soon as it starts to contract to actuate said switch and close said circuit, means for adjusting the fulcrum of said lever, said last named means including a thermostat, a lever actuated by said thermostat and upon which said switch lever is fulcrumed, and one or more auxiliary switches for actuating auxiliary circuits associated with and operable by said member as said chamber expands and contracts.

ERNEST ZURCHER.